US008657603B2

(12) United States Patent
Solomon (10) Patent No.: US 8,657,603 B2
(45) Date of Patent: Feb. 25, 2014

(54) SYSTEM FOR COMPILING KNITTING/CROCHETING PATTERNS INTO STEPWISE TIME-ADJUSTABLE VOICE AND VISUAL INSTRUCTIONS

(76) Inventor: Leslye Zina Solomon, Owings Mills, MD (US)

( * ) Notice: Subject to any disclaimer, the term of this patent is extended or adjusted under 35 U.S.C. 154(b) by 22 days.

(21) Appl. No.: 13/457,679

(22) Filed: Apr. 27, 2012

(65) Prior Publication Data

US 2012/0282575 A1    Nov. 8, 2012

Related U.S. Application Data

(60) Provisional application No. 61/479,663, filed on Apr. 27, 2011.

(51) Int. Cl.
  *G09B 19/20* (2006.01)
(52) U.S. Cl.
  USPC ............................................... 434/95
(58) Field of Classification Search
  USPC ............................................... 434/95
  See application file for complete search history.

(56) References Cited

U.S. PATENT DOCUMENTS

| | | | | |
|---|---|---|---|---|
| 4,530,665 A * | 7/1985 | Colonel | .......................... | 434/95 |
| 4,578,036 A * | 3/1986 | Leighton | .......................... | 434/95 |
| 4,608,642 A * | 8/1986 | Shima | .......................... | 700/141 |
| 4,754,431 A * | 6/1988 | Jenson | .......................... | 365/158 |
| 5,719,777 A * | 2/1998 | Kotaki | .......................... | 700/131 |
| 2003/0027105 A1* | 2/2003 | Davis | .............................. | 434/95 |
| 2007/0260352 A1* | 11/2007 | Magee et al. | ................. | 700/131 |

* cited by examiner

*Primary Examiner* — Kesha Frisby
(74) *Attorney, Agent, or Firm* — Ober, Kaler, Grimes & Shriver; Royal W. Craig (57) ABSTRACT

A system for authoring knitting, crocheting, weaving patterns and other fiber arts patterns, and for converting those patterns into stepwise voice and visual instructions comprising a hardware architecture and modular software including a database of predefined stitch objects each corresponding to a stitching step or sequence. Each stitch object is linked in the database to a sound bite enunciating that stitch step and to a graphic illustration depicting that stitch step with a written explanation. The software includes an authoring module with a pattern compilation user-interface that allows a user to construct a complete pattern by selecting knitting commands from a menu of predefined commands in the database. Once constructed, the pattern is loaded into a playback module which employs an enunciation engine that speaks the complete pattern step-by-step and a playback user interface that displays a visual depiction and description of each step all at a user defined pace.

19 Claims, 6 Drawing Sheets

| Back | New Project | Start |

*Name of Project

Yarn Name

*Weight of Yarn

*Gauge stitches per   cm.

*Needle Size

Publication

Notes

SYSTEM FOR COMPILING KNITTING/CROCHETING PATTERNS INTO STEPWISE TIME-ADJUSTABLE VOICE AND VISUAL INSTRUCTIONS

CROSS-REFERENCE TO RELATED APPLICATIONS

The present application derives priority from U.S. Provisional Patent Application 61/479,663 filed 27 Apr. 2011.

BACKGROUND OF THE INVENTION

1. Field of the Invention

The present invention relates to a computer-implemented system and method for authoring knitting and crocheting patterns and for converting the patterns into stepwise voice and visual instructions.

2. Description of the Background

Knitting is a popular method for making knit items from thread or yarn using consecutive loops, called stitches. Though long-considered a pastime for senior citizens, knitting is in the midst of a revival. An influx of younger knitters are helping to popularize the craft, as is the Internet which allows knitters to connect, share interests and learn from each other.

Knitting is simple. As each row of loops progresses, each new loop is pulled through an existing loop. The active stitches are held on a needle until another loop can be passed through them. This process eventually results in a final knitted product. The "knit" and the "purl" are the foundation stitches of knitting. The knit stitch pulls a loop of yarn through an existing loop on the needle in one direction. Pulling it through in the opposite direction creates the purl stitch. Armed with the knit and the purl, a knitter can combine these stitches in an endless variety of textured stitch patterns. Crocheting is similar except that a single crochet hook is used instead of two knitting needles. In both cases, knowing the basic stitches is the easy part. Knowing how to read stitch patterns is vastly more complex.

Stitch patterns are based on repeats (individual stitch repeats as well as row repeats). A given stitch repeats across a row, a series of rows repeats vertically, and so on. Written instructions give row-by-row directions for a single repeat. Like reading sheet music, knitting instructions follow certain conventions and use lots of abbreviations. The following example shows a simple stitch pattern in written form:

Row 1 (right side): *K2, p2; rep from *.
Row 2 (wrong side): *P2, k2; rep from *.

This means that on the first row (with front side facing) the knitter knits 2 stitches, purl 2 stitches, and repeat to the end of the row. On the next row (flip side facing), the knitter purls 2 stitches, knit 2 stitches, and repeat this sequence to the end of the row. Each type of stitch is indicated by a letter followed by the number indicating how many of that stitch is required. The letter P stands for purl and the letter K is for knit. If a pattern says Row One: P5, K5, you should purl five stitches and then knit five stitches on your first row.

The asterisks indicate "repeats" which are important. An asterisk indicates that whatever follows gets repeated. For example, *P1, K1 tells you to purl one stitch, knit one stitch, and again purl one stitch and knit one stitch. Brackets or parenthesis also connote repeats and so this may also be written as [P1, K1]2x. K2, * p8, k4, rep from * tells you to knit two stitches, purl 8, knit 4, and to keep purling 8 then knitting 4 until the end of the row. Complex repeat patterns can be much more difficult to follow.

The key to efficient and error-free knitting is maintaining complete focus and excellent memory. The knitter must read the pattern, memorize a step long enough to take their eyes off the text, look at their hands, needles, and yarn and do the various knitting steps and, once done, regain the last place in the written pattern. Some stitch repeats may be multiple steps and lines long. It is tedious to keep looking back and forth at the text until the knitting repeat is completed and/or learned. This is where knitters forget, take additional time to locate and re-read the direction, make a mistake by doing the step out of order or incorrectly, and frequently struggle, all resulting in the need to re-start the repeat or the entire row. Distractions complicate the process even more. Knitting is a pastime often done while watching or waiting for someone or something, such as watching the children at the playground or beach. Distractions are plentiful. Atop the complexity and distractions, a large population of elderly knitters lacks the excellent memory needed for efficient and error-free knitting. A system for translating printed knitting and/or crocheting instructions into audible knitting instructions would be beneficial, since it would reduce the need for sight memory, and knitters could keep knitting as they listen to the instructions.

Systems and methods for converting text-to-speech and text-to-voice are well known for use in various applications. However, such systems are not readily adaptable for converting knitting/crocheting written patterns into step-by-step spoken voice instructions. Knitting instructions are not like reading music. More is involved than a simple digital voice library and a set of playback rules. Every knitter proceeds at their unique pace. Moreover, pace is not constant throughout the pattern. Some knitters will perform certain stitches faster than others. Consequently, any system useful for enunciating knitting/crocheting by reading spoken voice instructions from written patterns must be fully customizable to each user's pace, allowing preset of the stitch pacing on a stitch-by-stitch basis. Such a system would preferably allow user-construction of custom knitting patterns along with downloading of pre-defined knitting patterns in standard knitting notation. The system would include a library of predefined knitting objects each corresponding to an established knitting notation, and relationally mapped to a digital voice library containing a corresponding plurality of voice recordings (each knitting object corresponding to at least one available voice recording). An enunciation software engine would interpret the knitting objects in an assembled pattern and compile them into coherent stepwise voice instructions. Such a system would also require a robust user-control suite for allowing pause, repeat, delays, etc. to suit one's individual pace.

Additional advantages, objects, and features of the invention will be set forth in part in the description which follows and in part will become apparent to those having ordinary skill in the art upon examination of the following or may be learned from practice of the invention.

SUMMARY OF THE INVENTION

It is, therefore, an object of the invention to provide a comprehensive system for authoring complete knitting/crocheting patterns.

It is another object to provide a comprehensive system for allowing download of predefined and preassembled knitting/crocheting patterns.

It is another object to provide a system for compiling both authored and downloaded knitting/crocheting patterns into stepwise time-adjustable voice and visual instructions to eliminate the need for sight memory.

It is another object to provide a system as described above that is portable, and capable of implementation on cell phones or personal digital assistants (PDAs).

It is another object to provide an enunciation software engine for interpreting the knitting objects and compiling them into coherent stepwise voice instructions.

It is still another object to provide a system as described above that provides a playback user interface with a robust user-control suite for allowing pause, repeat, delays, etc. customized to suit one's individual pace.

In accordance with the foregoing objects, the present invention provides a system for authoring and downloading pre-authored knitting and crocheting patterns and for converting those patterns into stepwise time-adjustable voice and visual instructions in the most efficient manner. The system comprises a hardware architecture and modular software including a database of predefined stitch objects each corresponding to a standard knitting step or sequence. Each stitch object is linked in the database to a pre-recorded sound byte bite enunciating that stitch step. In addition, each stitch object is linked to a graphic illustration depicting that stitch step and/or a written explanation. The software includes an authoring module with a pattern compilation user-interface that allows a user to construct a complete pattern row-by-row, by selecting knitting commands from a menu of the predefined commands in the database and placing them into a pattern-building window. The system also includes a file sharing system by which previously-completed knitting patterns can be downloaded from a central server.

Given an newly or previously-authored knitting pattern, the pattern is loaded into a playback module which employs an enunciation engine that speaks the complete pattern step-by-step, providing user controls for controlling the pace of both the enunciation engine and visual display. In addition, the playback user interface includes a help function/glossary that displays a visual depiction and/or description of each step.

The invention greatly expedites user-compilation of a knitting pattern and then reads the steps of the pattern back to the user at the pace they select, eliminating the need to read a written pattern. This reduces the chance of mistakes and increases productivity and enjoyment even for the most complicated knit patterns.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Reference will now be made in detail to preferred embodiments of the present invention, examples of which are illustrated in the accompanying drawings. Wherever possible, the same reference numbers will be used throughout the drawings to refer to the same or like parts.

The present invention is a system for authoring knitting and crocheting patterns and/or for downloading pre-authored patterns, and for compiling them and transforming the compiled patterns into stepwise time-adjustable voice and visual instructions. The voice instructions are enunciated in a stepwise manner at a user-controlled pace.

Although the invention is disclosed in the context of a knitting embodiment, one skilled in the art will readily understand that the system may be readily adapted for crocheting by simple substitution of content, as well as weaving and similar and other fiber arts.

The system includes modular software resident on a computer system. The modular software generally includes a database of annotated knitting commands, an authoring module that presents a user interface for allowing user-compilation of a pattern of knitting commands from the database, a playback module with an enunciation engine for converting the sequence of annotated knitting patterns into stepwise voice instructions, and a playback interface with user-controls for controlling pace and progress of the enunciation engine.

In an embodiment, the database of annotated knitting commands, authoring module and playback module is downloaded from a central server and installed locally on client terminals such as cellular phones and personal digital assistants (PDAs), PC Tablets, as well as laptops, PCs, eBook readers, iPads™, or other computing devices that use touch sensitive displays or panels. The annotated knitting command database may likewise be downloaded from a central server and resident on the client terminals. Alternatively, the annotated knitting command database may remain on the central server for remote access by the authoring module and playback module. It is also desirable to periodically update the knitting command database. Toward this end it may be hosted on a remote server maintained by an application service provider (ASP).

In yet another web-based or cloud-based embodiment, all software is resident on a distributed client-server system comprising a host server and one or more client workstations. The server system may be a PC-based networked client/server system comprising at least one server maintained by a manager or ASP to host a client-accessible enunciation engine and user-control software accessed via a website URL, plus annotated knitting command database.

Figure 1:
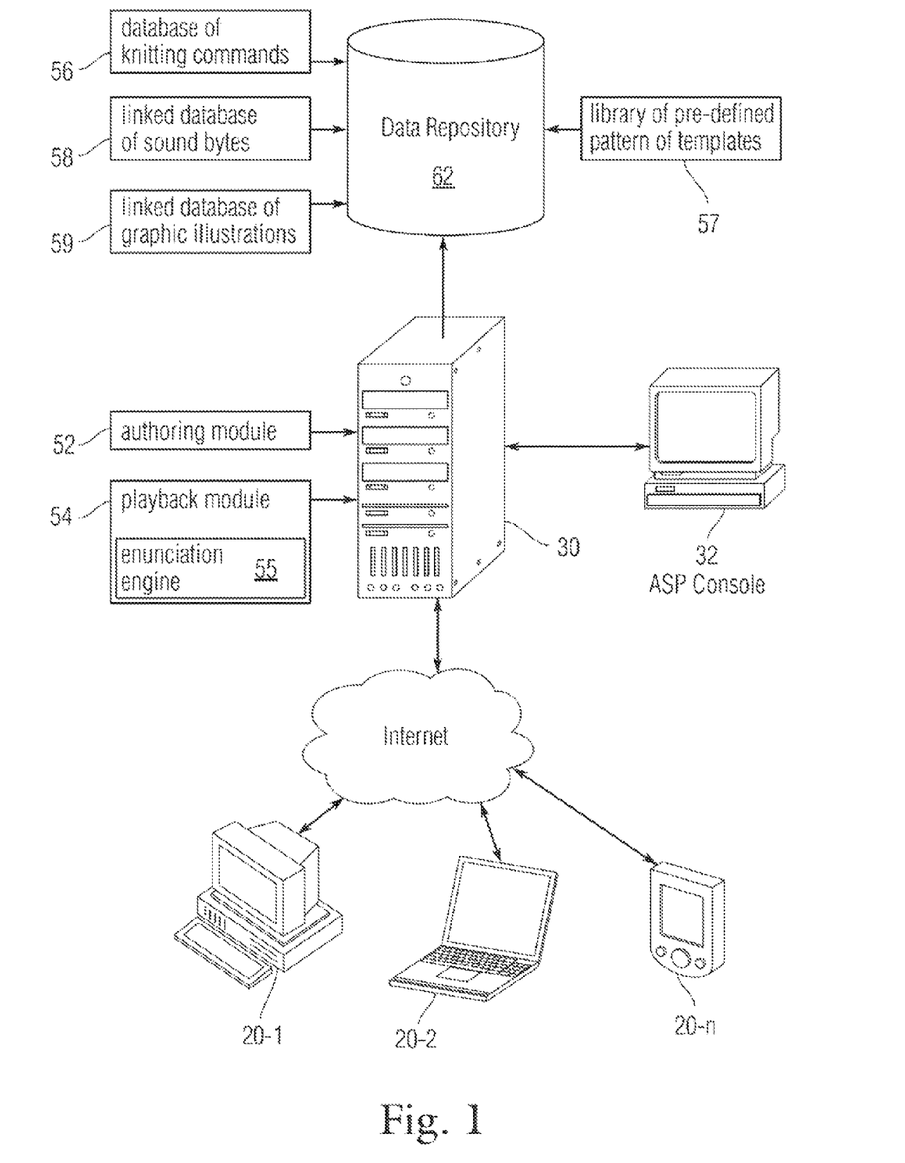
FIG. 1 is an illustration of the hardware architecture of both the web-based embodiment and the local embodiment of the invention.

FIG. 1 is an illustration of the hardware architecture of both the web-based embodiment and the local embodiment. The service is delivered through a plurality of client terminals 20-1 ... n as described above. Groups of clients 20-1.n are connected to a network Server 30 via an internet backbone. The Server 30 is a web-enabled server hosting a resident routing database, which stores data authentication and verification correlating to registered participants. The server 30 remains under ASP control via ASP console 32, and server 30/console 32 have access to a server database 62 of annotated knitting commands. When a new user registers, a copy of the authoring module 52, playback module 54, and database of knitting commands 56 may be pushed out to client device 20-1 in a compressed self-extracting local installation package. Alternately, only the authoring module 52 and playback module 54 may be pushed out to client device 20-1, the database of knitting commands 56 remaining on the server database 62 and in internet or cellular communication with the authoring module 52 and playback module 54. In yet another alternative embodiment, all of the authoring module 52, playback module 54 and the database of knitting commands 56 may remain on the server database 62, all accessible by internet or cellular using the client device 20-1 and only a thin client front end program is pushed to the client device 20-1. In this latter case, the thin client front end program at each client 20-1 ... n gains access to a web portal at the central server 30, and all of the software modules are accessible as cloud software through the web portal to facilitate the overall workflow and data exchange. A library of pre-authored knitting patterns 57 is also maintained on the server database 62 for download by users who prefer to follow existing patterns.

The method of the present invention as described below simplifies the task of following knitting/crochet multi-step pattern repeats.

Figure 2:
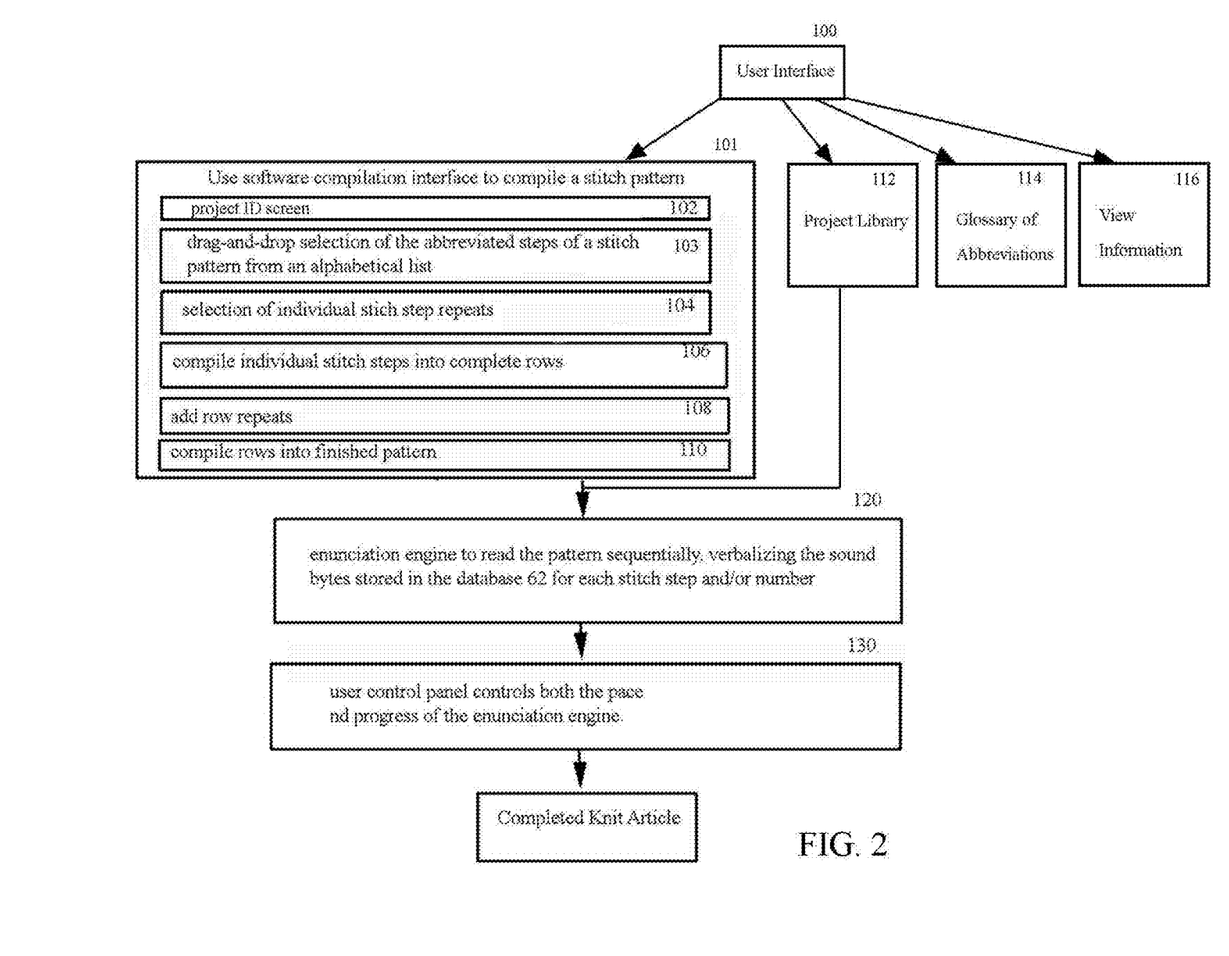
FIG. 2 is a simplified block diagram of the core software steps of the present invention.

FIG. 2 is a simplified block diagram of the software steps according to the present invention. At step 100, the user selects via graphical user interface whether to 1) Create a New Project; 2) Open an Existing Project from the Project Library; 3) Refer to a Glossary of Abbreviations; or 4) View Information About the Software and Authors.

Figure 3:
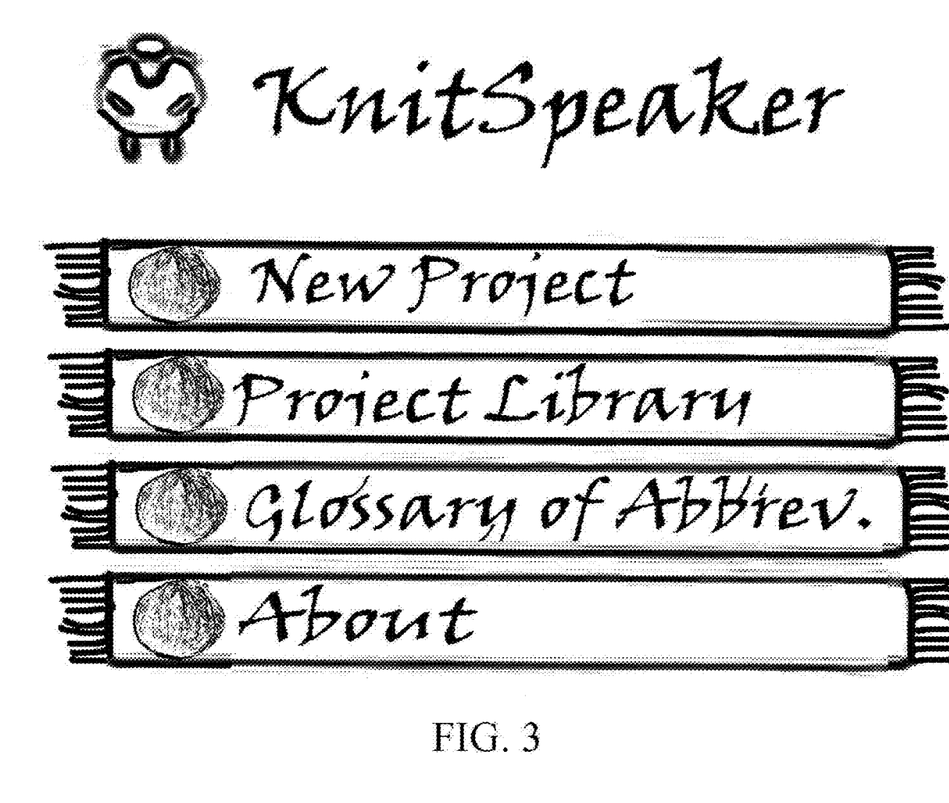
FIG. 3 is a screen shot of the initial splash screen.

FIG. 3 is a screen shot of the graphical user interface at step 100. If the user selects "New Project" at step 101 the graphical user interface executes the authoring module 52 to compile a stitch pattern via a succession of substeps 102-110 as described below.

If the user selects "Project Library", then at step 112 a list of previously started (and/or fully compiled) projects is presented and the user can select one to finish it, or to re-execute it. All previously started (or fully compiled) stitch patterns are stored locally, can be retrieved at will, and are loaded upon pressing "Next." Alternatively, the graphical user interface provides a portal through central server 30 to the library of pre-authored knitting pattern 57 on the server database 62 to allow remote download of selected pre-existing patterns by users who prefer not to create their own. If at step 114 the user selects "Refer to a Glossary of Abbreviations" an indexed-tabbed visual guide of all knitting abbreviations is presented, also described below.

If at step 116 the user selects "About" they are presented with biographical and contact information about the software and authors.

Given user-selection of "New Project" at step 101 the graphical user interface executes the authoring module 52 which facilitates the user's compilation of a stitch pattern via a succession of substeps. This begins at substep 102 with a project ID screen (see FIG. 4 and description below) which presents a form soliciting a pattern name and other salient parameters associated with the pattern. The user completes the form as desired, naming the project and identifying the yarn used, weight of yarn, gauge, needle size, publication, and any other notes Completion and pressing "Next" initiates the authoring module 52. The authoring module 52 executes substeps 103-110 via a compilation user-interface, facilitating authoring of a complete stitch pattern. FIG. 5 (also described below) is a screen print of the compilation user-interface. The compilation user-interface includes a scroll-wheel selector 120 of commonly-understood stitch abbreviations. A suitable scroll wheel selector can be constructed using Apple's™ UIPickerView control with XCode 4.2 for any Apple™ device. The scroll wheel selector 120 includes three independent selection wheels, the leftmost representing a category of stitch command, the middle wheel representing the commonly used stitch abbreviations (k for knit or p for purl, etc.) within the selected category. Referring back to FIG. 2, at substep 104 the software compilation interface allows user-adjustment of individual stitch repeats, and the rightmost wheel (FIG. 5) allows selection of the number of stitches. The selections available on the second and third selection wheels change dependent upon the first selection. Thus, for example, if the user selects the category of "Primary" stitch commands as shown, the middle wheel displays the commonly used stitch abbreviations within that category, and the rightmost wheel indicates any number between 0-600. If the user wants to include knit 1 stitch in their pattern, they select the category of "Primary" stitch commands, move the middle wheel as shown to select K, and move the rightmost wheel to display 1. Upon pressing enter (FIG. 5 check mark 122) the abbreviation K1 is entered in a pattern window 130 appearing directly above. Similarly "slip slip knit" would be abbreviated "ssk", etc.

At substep 106 the pattern compilation interface further allows arrangement of the numbered steps into complete row sequences, for example, Row 1 (right side): K2, p2.

At substep 108 row repeats (parts of rows that need to be repeated within a row) are indicated by * asterisks. In the language of knitting, this shortens the written word. For example, Row 1 (right side): *K1, p5; rep from *3 times. In the common language of knitting, the direction for "knit one, purl five" should be performed in this case a total of three times. From the scroll wheel 120 of FIG. 5, the user selects the "Repeat" category as shown, the middle wheel displays the *Start to indicate the beginning of directions that should be repeated, and "Repeat" "End" indicates the end of the repeat. When "repeat"-"End" is selected, the rightmost wheel indicates any number between infinity to 0-600. Thus, for example, if the user has inputted a repeat of K1, P5 for purling one stitch and knitting 5 stitches in the pattern window 130 they can select the "Repeat" category from the scroll wheel 120 of FIG. 5 to insert the asterisk and "3" to insert rep from *3 times, and the audio will repeat as indicated without having to type-input the repeat 3 separate times.

Finally, at substep 110 the completed row sequences are compiled into fully articulated patterns appearing row-by-row in the pattern window 130 such as, for example:
Row 1 (right side): *K2, p2; rep from *.
Row 2 (wrong side): *P2, k2; rep from *.

The pattern window 130 of the compilation interface displays the entire pattern so that the user can check the pattern on the screen to make sure it is correct. At this point, if desired, the user can add or subtract timing characters to the pattern such as spacers +++ after each step, which introduce brief delays. Each + symbol added represents one second of time.

Each stitch in the database of knitting commands 56 and each number # is linked to a pre-recorded sound bite stored in a sound bite database 58 in data repository 62, enunciating that stitch step and/or number. Additionally, each stitch in the database of knitting commands 56 is linked to a graphic illustration or a written explanation to define the abbreviations or phrases stored in a graphics database 59 also in the data repository 62, which (where necessary) includes a side type display sequence and/or written description of that knitting step. As described below, the linked graphic illustration in graphics database 59 allows a selection-specific help function accessible by clicking on the i button 125 (FIG. 5) or through the glossary of abbreviations 114 (FIG. 2).

Given a fully authored pattern as above, the user can save it by clicking SAVE (FIG. 5, then at step 120 the user employs a set of user controls 140 to initiate and control the playback module 54. The playback module 54 loads the compiled pattern into an enunciation engine 55 which reads the pattern sequentially, verbalizing the sound bites stored in the sound bite database 58 of data repository 62 for each stitch step and/or number. As the enunciation engine 55 reads the sound bites, the cursor is simultaneously positioned beneath the corresponding knitting command appearing in the pattern window 130 so that the user can see what is being enunciated. The enunciation engine 55 assembles the pattern/sound-bites into cognizable voice instructions. This way, the user need only listen and follow the order of steps of a knitting or crochet pattern.

The user controls 140 and a delay timer 148 of the playback module 54 adjust the playback pace to suit the user's pace. This eliminates the dependency on sight memory, and the tedium of repeatedly needing to refer back to the printed pattern. The simultaneously-displayed visual of each step adds a quick sight reference if the user forgets the spoken words.

At step 130, the user employs the user control panel 140 and delay timer 148 to control both the pace and progress of the playback module 54, affecting both the enunciation engine 55 and the visual display is also user-controlled, for example, the abbreviation of PSSO (pass slip stitch over) will fade to reveal the next direction of YO (yarn over) in accordance with the spoken word. This is important, as individuals have different paces and need to be able to pause if interrupted or confused. The speed of the playback can be adjusted by the abilities in the application to control the span of time between each step of the repeat. The user can adjust the speed of the play and read-back to the comfortable pace of the user's desired speed.

The user follows the enunciated instructions to completion, resulting in a completed knit article. The present system simplifies the task of following knitting/crochet multi-step pattern repeats and eliminates the need for sight memory. The system is preferably deployed on mobile client devices 20-1 ... n such as cell phones and PDAs, thereby adding a new and significant mobile advantage.

The features of the various screens introduced above are described below in more detail.

Figure 4:
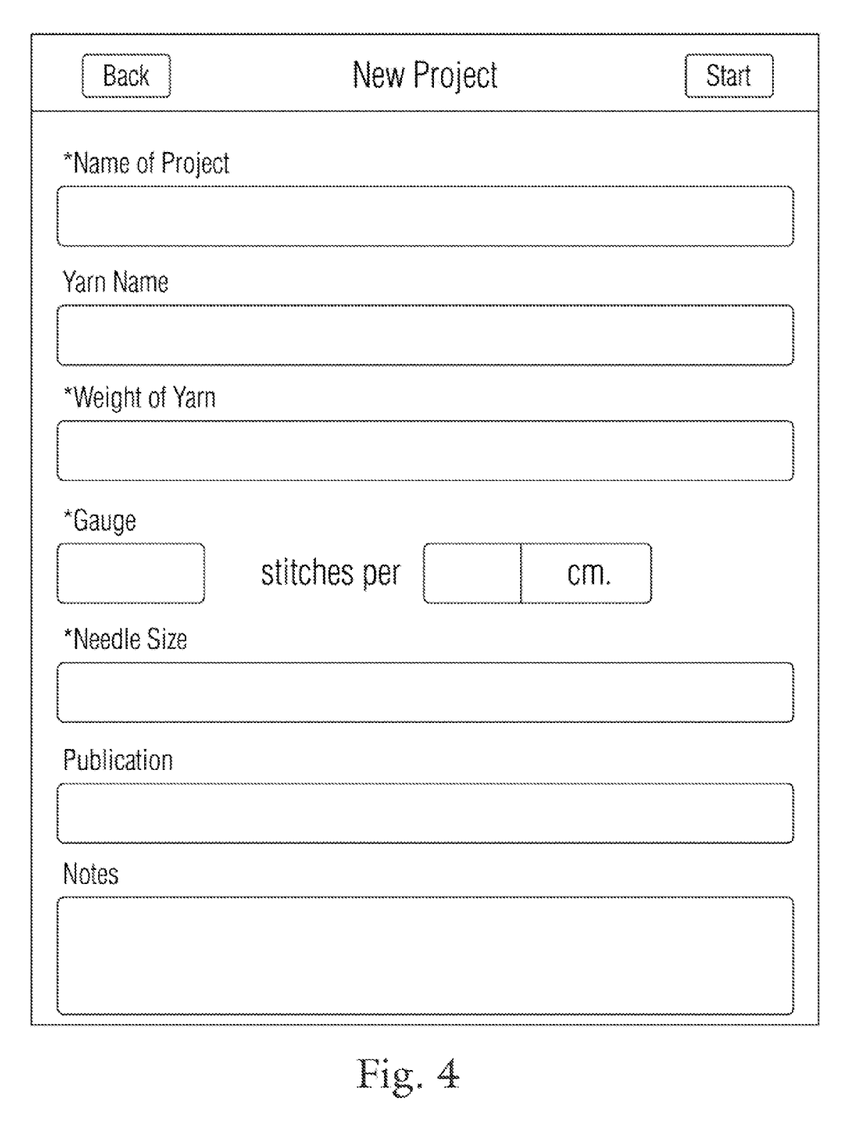
FIG. 4 is a screen shot of the project ID screen.
Figure 5:
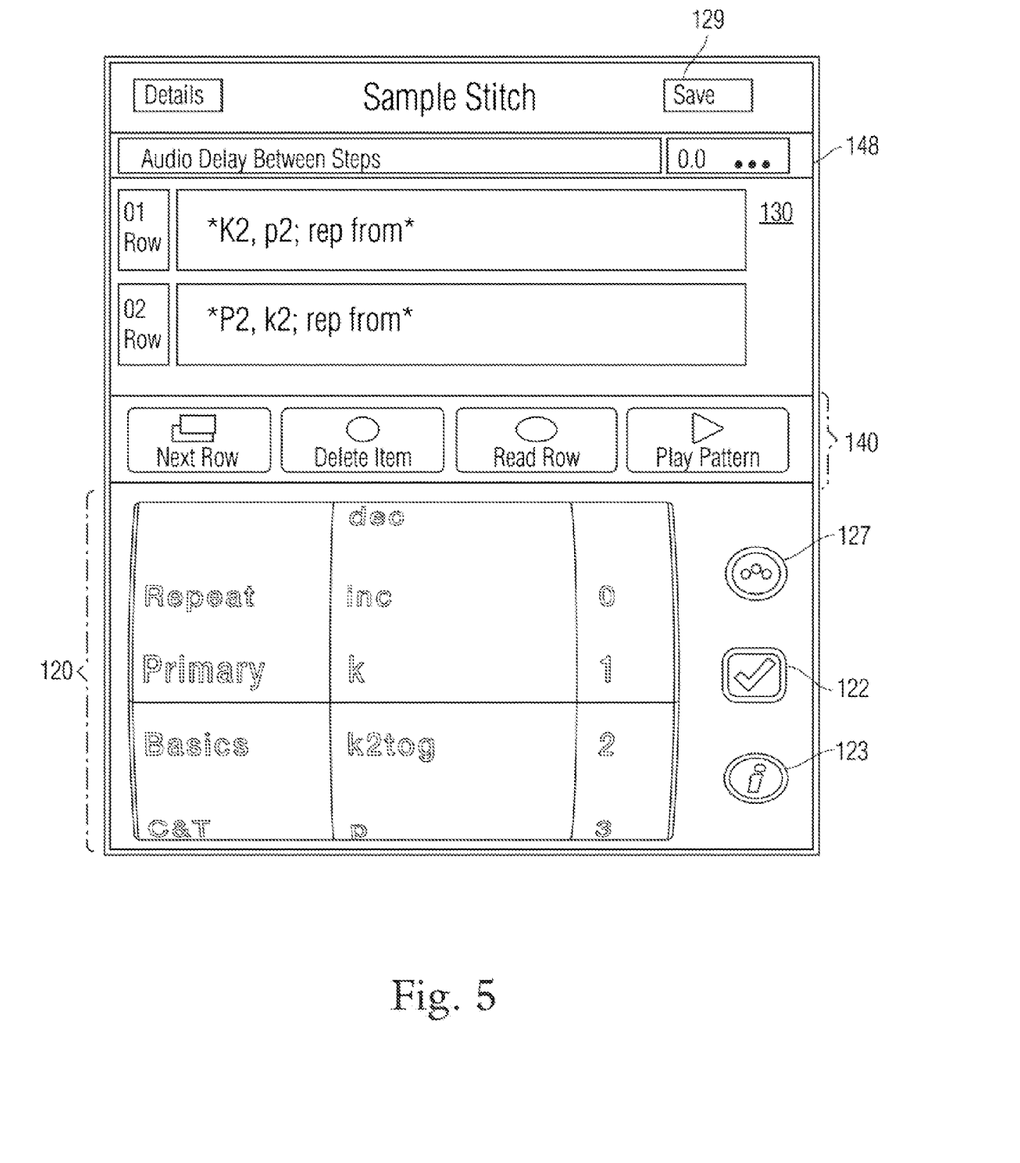
FIG. 5 is a screen shot of the authoring user interface.

FIG. 4 is a screen shot of the project ID screen. The project ID screen presents a form soliciting a pattern name, and for user convenience, other salient details associated with the pattern that the user may want to keep as a reference. Presently these include the yarn name used, weight of yarn, yarn gauge, needle size, publication, and any notes. The user completes the form as desired and upon pressing "Start" this engenders the authoring module 52 (FIG. 2 substep 103), which presents the user with the pattern compilation interface of FIG. 5.

The pattern compilation user-interface of FIG. 5 allows efficient command-by-command and row-by-row construction of a complete pattern. The user selects individual stitches or predefined groups of stitches from the scroll-wheel 120, and clicks enter 122 to place them into the pattern-building window 130. The scrollable menu of predefined commands is categorized (leftmost scroll wheel) by Primary, Basics, Cables & Twists, Miscellaneous, and Numbers categories.

The Primary category is a short list of the most often used knitting steps.

In alphabetical order on the middle scroll-wheel the user sees:

Dec (decrease)
Inc (increase)
K (knit)
K2tog (knit 2 together)
P (purl)
P2tog (purl 2 together)
Psso (pass slip stitch over)
Sl (slip)
Ssk (slip, slip, knit)

Yo (yarn over)

The user selects the desired abbreviation then scrolls through the rightmost scroll wheel to select the number of command repeats. For example, for the step "K3" the user will select K for knit and scroll to and align the number 3 with the K. Touching enter 122 inputs K3 in pattern window 130.

The Basics Category of abbreviations is a general list of words, abbreviations, and phrases or steps commonly found in knitting.

The C & T Category (cables and twists) is a special category for the most often-used compound commands for cables and twists. A typical direction to perform a cable might be to "slip next 2 stitches to a cable needle and hold in back (or front), knit 2, knit 2 from cable needle."

The Miscellaneous Category list of abbreviations comprises any less frequently used abbreviations. Importantly, if there is a stitch that is not already listed, the user can define a "custom stitch" by selecting the same in the Misc category.

The Repeat Category allows sets of repeatable groups of steps. To start a repeat the user selects REPEAT and *Start, (no numbers appear in the third column) and enters the selection. An asterisk appears in window 130 to indicate the beginning of the repeat. The user next selects REPEAT and End* to end the repeat. A pair of asterisks * is inserted into window 130 to repeat instructions between the asterisks as many times as directed. The number selection determines the number of times the repeat occurs, with the infinity symbol ∞ (found above the 0) allowing continuous repeat until the user manually stops it if the user is unsure of the number of times a repeat takes place within a row. Thus, "Row 3: K2, (P8, K2) to the end" means Knit 2 stitches; then repeat the instructions in the parenthesis (Purl 8, Knit 2) until the end of the row. Row 2: k1, *k1, k2 tog, yo, k1 yo, k2 tog, k2* means repeat the instructions between the asterisk to the end of row. k2, *(p1, k2) twice, p1, k1; rep from *, end p1 means repeat everything from the asterisk across the entire row until you get to the last stitch, then purl one.

The Time Spacer control 127 (FIG. 5) provides an important feature of the present invention, namely, an ability to customize the knitting time needed to comfortably perform each step of the pattern. After selecting the category, the knitting abbreviations, and number of stitches by the scroll wheel 120, the user can estimate how much time is needed to perform the selection. By touching the time-spacer (+) button 127 after each selection a + is added after the command, each + representing one second of time. Studies have shown that the average time a knitter takes to knit a stitch is 1½ to 2 seconds. However, if K2 will take 4 seconds the user can place four time-spaces (+) after K2.

Preferably, the foregoing categories collectively include at least the following predefined stitches/groupings:

alt (alternate)
BC (back cross)
BO (bind off)
BPC (back purl cross)
cross 2 L (cross two stitches to the left)
cross 2 R (cross two stitches to the right)
double inc (knit once into the back loop, then . . .
FC (front cross)
FPC (Front purl cross)
garter stitch
Incl (including
fl (front loop (s)
inc (increase)
k (knit)
Knit entire row -continued k1, p1, k1 (knit, purl, and knit into the same stitch . . .
k-b ( knit in back loop of stitches)
k2tog b (knit 2 stitches together through back loop
k-b (knit stitch in row below)
Ktbl (knit through back loop)
kfb (knit into the front and back of a stitch
kwt (knit wrapping twice)
k2tog (knit 2 together)
kwise (knitwise)
pm (place marker)
p2tog (purl 2 stitches together)
psso (pass slipped stitch over
Purl entire row
purl inc (purl once into the front loop, then once
pwise (purlwise)
skp (slip, knit, pass stitch over
sk2p (slip 1 , knit 2 together, pass slip stitch over the knit 2 together)
sl (slip)
sl 1k (slip 1 knitwise)
sl 1p (slip 1 purlwise)
sl st (slip stitch(es))
sl 1-k2tog passo
sl 2-kl-p2sso (slip 2, knit 1, pass 2 sliped sts over)
ssk (slip, slip, knit these 2 stitches together)
sssk (slip, slip, skip, knit 3 stitches together)
st (stitch)
turn K in row below
LH (left hand)
lp(s) (loop(s))
LT (left twist)
M1 (make 1 stitch)
M1 p-st (make one purl stitch)
MB (make bobble)
P (purl)
p-b (purl stitch in the row below)
p2 togb (purl 2 together through back loop)
pm (place marker)
PLT (purl left twist)
PRT (purl right twist)
st st (stockinette stitch)
tbl (through back loop)
times (number of times)
tog (together)
times
TwL (twist left)
TwR (twist right)
Tw3 (twist three)
ws (wrong side)
wyib (with yarn in back)
wyif (with yarn in front)
yfwd (yarn forward)
yo (yarn over)
yrn (yarn around needle)
yon (yarn over needle)

The user enters the foregoing knitting commands step-by-step into the pattern window 130. The authoring module 52 automatically interjects a comma between each command, and the user can selectively add time-spacers between each step.

As stated previously, each stitch step or sequence on the menu is stored in database 52 on data repository 62. Every entry in database 52 is (every abbreviation, word, or number) is linked to a pre-recorded sound bite stored in the database 56 also on repository 62. Each sound bite enunciates the corresponding stitch step. Additionally, each stitch step on the list is linked to a graphic illustration and/or written explanation stored in the graphic database 59 on repository 62 depicting that stitch step along with a written explanation. Thus, if the user is unfamiliar with an abbreviation, they need only touch on the i button 125 of FIG. 5 to see a help screen comprising a written description and/or a slide photo sequence illustrating how to do the stitch step.

Figure 6:
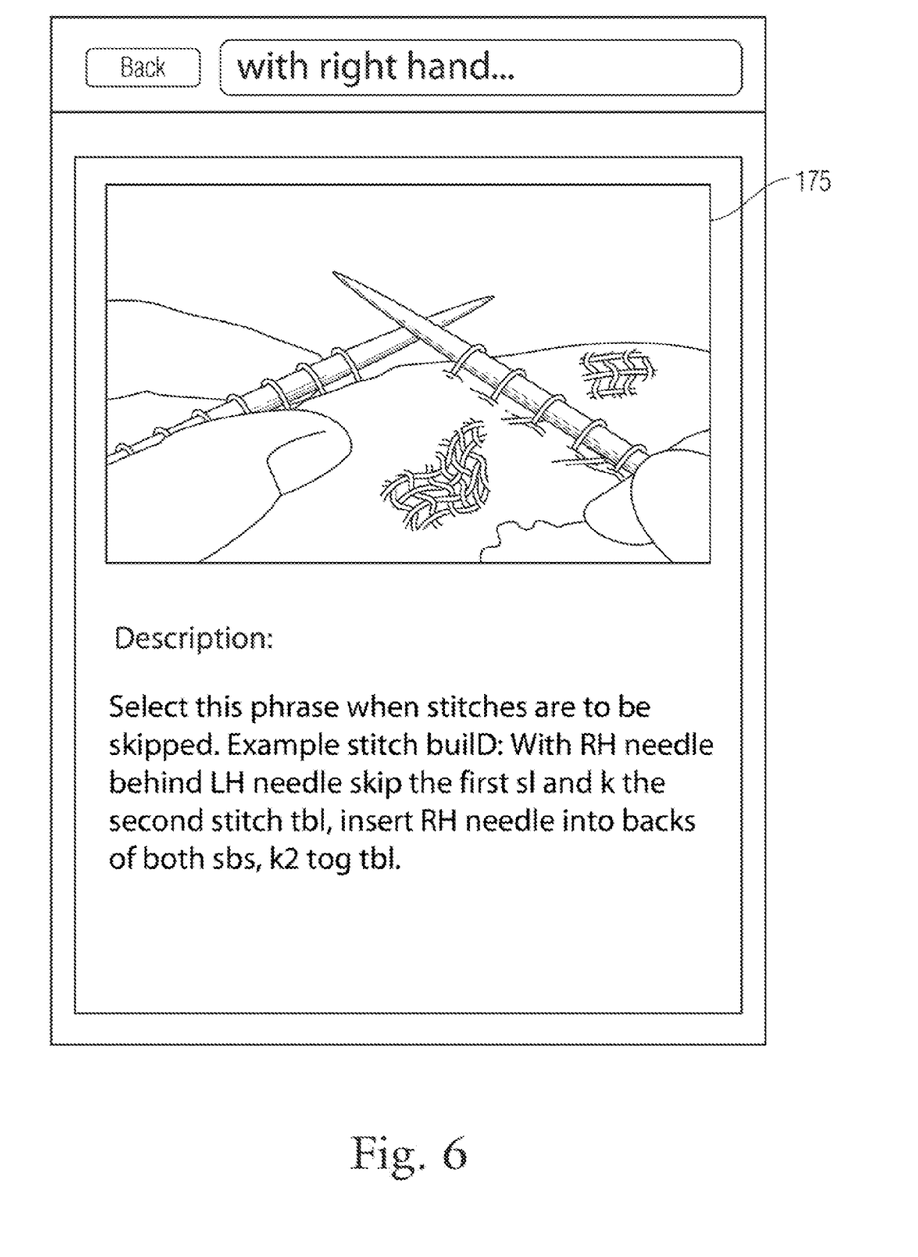
FIG. 6 is a screen shot illustrating an exemplary help screen.

FIG. 6 is a screen shot illustrating an exemplary help screen if the user had clicked on the i button 125 of FIG. 5 while YO (yarn over) was selected. The same help screen can be acquired through the Glossary 114 of FIG. 2. The help screen includes a text description and an embedded series of photo at a slow frame rate (3-4 frames at between 1-10 fps) illustrating the main steps involved in the stitch command.

Referring back to FIG. 5, the user authors their desired pattern row-by-row by clicking on any of the menu of abbreviations, and touching the check button, the step is placed to the pattern-building window shown at left, depositing them in the appropriate row and position.

Finally, at substep 110 the user clicks on NEXT ROW to input the consecutive rows and the completed row sequences are compiled into a fully compiled pattern. The user can check the pattern on the screen that shows the entire pattern to ensure that the pattern is correct. To check a pattern the user touches "Read Row" to hear the row while the user refers to the text of a pattern. There is no time delay while checking a pattern.

Clicking "NEXT" after completing a stitch pattern or after loading a preexisting pattern loads the playback module 54, which loads the completed pattern into the enunciation engine 55.

As indicated above, the playback module 54 includes a user interface (see FIG. 5) with a user control panel for controlling the pace of the enunciation engine 55. By clicking "Start", the enunciation engine processes the compiled pattern step-by-step and row-by-row, cross-referencing each stitch step on the list, each number and each repeat, and recalling the pre-recorded sound bite stored in the database 62. The compiled pattern is displayed in the display window 130 (top of FIG. 5) row-by-row at a user-selectable pace. Each row of the pattern is shown on its own screen in blue type and immediately below it all steps of the row are listed. Like a karaoke display, each step of the pattern is highlighted ass it is being enunciated.

Concurrently, the enunciation engine recalls the associated sound bites and verbalizes each stitch, step and/or number. The user control panel includes a pace adjustment control 148 labeled "Audio Delay Between Steps", and control panel 140 which includes a "Next Row", "Delete Item", "Read Row" and "Play Pattern/Pause/Stop" control. The "Audio Delay" control 148 allows the user to quicken/slow the pace of the enunciation engine 155 to suit themselves. There is a default interval of 0 seconds per displayed/verbalized step. Customized time is added by touching the estimated quantity of seconds by repeatedly touching the + button. However, the Audio Delay control 148 facilitates adjustment to add desired number of seconds globally to all steps.

If there is an outside interruption the user can depress the Play Pattern/Pause/Stop control 140, attend to it, and returns exactly where they left off. When a row is completed the user can let it continue to the next row or manually stop the audio to comfortably prepare to do the next row.

Using headphones or the speakers of the client device, the user can listen to the repeats so there is no memorization needed from the written pattern. They can observe their work while listening to the device. Moreover, the user no longer needs to tediously find the relevant text within a written pattern over and over again. The system reads and flashes directions at the user's own adjustable pace. The end result is more efficient knitting and fewer mistakes.

As stated above, a library of pre-authored knitting pattern 57 is maintained on the server database 62, and/or patterns may be made available for download from other commercial databases by users who prefer to follow existing patterns. In addition to browser capability for locally-stored patterns, the User Interface 100 may also include a web-enabled storefront for selecting and downloading existing patterns from remote locations. Conversely, authored knit patterns may be uploaded and offered for purchase or file-sharing by users. It should now be apparent that the above-described invention provides a comprehensive internet-based virtual workspace, database structure and tools for organizing and managing diverse information objects including tasks, documents, notes, and all other relevant information, all in a fully integrated and centralized fashion, thereby streamlining data management, data flow and user actions. The system is platform independent and accessible using commercially available browsers. Those skilled in the art will understand that various modifications and variations can be made in the present invention without departing from the spirit or scope of the invention. It is to be understood, therefore, that the invention may be practiced otherwise than as specifically set forth in the appended claims.

What is claimed:

1. A system for authoring knitting and crocheting patterns and for converting the patterns into stepwise pace-adjustable audio voice and graphical visual instructions to guide a user in knitting or crocheting elements of a stitch pattern by their hearing and seeing each voice and visual instruction, respectively, comprising modular software including:

a database of predefined stitch commands each corresponding to a stitching step, instruction or sequence, each stitch command being linked to a sound byte enunciating said stitching step;

an authoring module comprising a pattern compilation user-interlace for allowing a user to select and arrange individual commands or a stitch pattern to thereby construct a complete stitch pattern row-by-row, said pattern compilation user-interface including a menu of the predefined commands in said database listed by their common knit and crochet abbreviations, and a pattern-building window for displaying commands selected from said menu;

a playback module comprising an enunciation engine for enunciating the complete pattern constructed in said pattern compilation user interface as a stepwise sequence of vocal audio instructions so that said user can listen to said complete stitch pattern without having to look at any written page, and a playback user interface including user controls for controlling a pace by which said enunciation engine enunciates the steps in the sequence of vocal audio instructions.

2. The system for authoring knitting and crocheting patterns according to claim 1, wherein said predefined stitch commands are categorized in said database by type of stitching command.

3. The system for authoring knitting and crocheting patterns according to claim 2, wherein said pattern compilation user-interface comprises a scroll-wheel selector including a first selector wheel identifying a plurality of general categories of stitching commands, a second selector wheel identifying a plurality of individual stitching commands all within a selected one of said general categories, and a third selector wheel identifying a number of repeats for a selected one of said stitching commands.

4. The system for authoring knitting and crocheting patterns according to claim 1, wherein said playback module user controls include a delay control for adjusting the pace of the enunciation engine.

5. The system for authoring knitting and crocheting patterns according to claim 4, wherein said database of predefined stitch commands include a null delay command insertable into a pattern for introducing a fixed-interval audible delay.

6. The system for authoring knitting and crocheting patterns according to claim 5, wherein said database of predefined stitch commands includes a Start Repeat command and End Repeat command for delineating a portion of a pattern row to repeat, and a Repeat Number indicating a number of times to repeat said portion of the pattern row.

7. The system for authoring knitting and crocheting patterns according to claim 6, wherein said Repeat Number indicates any number of time to repeat said portion of the pattern from 1 to infinity.

8. The system for authoring knitting and crocheting patterns according to claim 7, wherein said enunciation engine interprets an infinity Repeat Number as an instruction to repeat said portion of the pattern continuously until manual intervention of said user at said playback user interface.

9. The system for authoring knitting and crocheting patterns according to claim 4, wherein said playback module user controls include a "Next Row", "Delete Item", "Read Row" and "Play Pattern/Pause/Stop" control.

10. The system for authoring knitting and crocheting patterns according to claim 1, wherein each stitch command is also linked to a graphic illustration depicting that stitch step with a written explanation.

11. The system for authoring knitting and crocheting patterns according to claim 10, wherein each said graphic illustration comprises a photo or a plurality of photo frames.

12. The system for authoring knitting and crocheting patterns according to claim 11, wherein said plurality of video frames are displayed at a frame rate of less than 10 fps.

13. A system for authoring knitting and crocheting patterns and for converting the patterns into stepwise pace-adjustable voice and visual instructions, comprising:

a database of predefined stitch commands each corresponding to a stitching step, instruction or sequence, each stitch command being linked to a sound byte enunciating said stitching step;

an authoring module comprising a pattern compilation user-interface for allowing a user to select and arrange individual predefined commands of a stitch pattern and thereby construct a complete stitch pattern row-by-row, said pattern compilation user-interface including a menu of the predefined commands in said database listed by their common abbreviations, and a pattern-building window for displaying commands selected from said menu in defined rows, the menu of predefined commands in said database including a Start Repeat command and End Repeat command for delineating a portion of a pattern row to repeat, and a Repeat Number indicating a number of times to repeat said portion of the pattern row;

a playback module comprising an enunciation engine for enunciating the complete pattern constructed in said pattern compilation user interlace as a stepwise sequence of vocal audio instructions so that said user can listen to said complete stitch pattern without having to look at any written page, and repeating said portion of the pattern row delineated between the Start Repeat command and End Repeat command in accordance with said Repeat Number; and a playback user interface including user controls for controlling a pace of said enunciation engine.

14. The system for authoring knitting and crocheting patterns according to claim 13, wherein said Repeat Number indicates any number of times to repeat said portion of the pattern from 1 to infinity.

15. The system for authoring knitting and crocheting patterns according to claim 14, wherein said enunciation engine interprets an infinity Repeat Number as an instruction to repeat said portion of the pattern continuously until manual intervention of said user at said playback user interface.

16. A system for authoring fiber patterns and for converting the patterns into stepwise audio voice and graphical visual instructions to guide a user in knitting or crocheting elements of a stitch pattern by their hearing and seeing each voice and visual instruction, respectively, while manually completing said patterns, comprising modular software including:
- a database of predefined stitch commands each corresponding to a stitching step, instruction or sequence, each stitch command being linked to a sound byte enunciating said stitching step;
- an authoring module comprising computer instructions stored on non-transitory memory for displaying a pattern compilation user-interface for allowing a user to construct a complete fiber pattern row-by-row, said pattern compilation user-interface including a menu of the predefined commands in said database listed by their common abbreviations, and a pattern-building window for displaying commands selected from said menu;
- a playback module comprising an enunciation engine comprising computer instructions stored on said non-transitory memory for enunciating the complete pattern constructed in said pattern compilation user interface as a stepwise sequence of vocal audio instructions at a user-defined pace, and a playback user interface comprising computer instructions stored on said non-transitory memory for displaying user controls for controlling a pace at which said enunciation engine enunciates the steps in the sequence of vocal audio instructions.

17. The system for authoring fiber patterns according to claim 16, wherein said predefined stitch commands are categorized in said database by type of stitching command.

18. The system for authoring fiber patterns according to claim 16, wherein said pattern compilation user-interface comprises a scroll-wheel selector including a first selector wheel identifying a category of stitching command, a second selector wheel identifying said stitching command, and a third selector wheel identifying a number of repeats for said stitching command.

19. The system for authoring or transferring fiber patterns according to claim 16, wherein said playback module user controls include a customizable delay control for adjusting the pace of the enunciation engine.

* * * * *